July 23, 1968     L. C. FOSTER     3,394,381
ACCELERATION RECORDER

Filed Feb. 21, 1967     2 Sheets-Sheet 1

Inventor
Leigh Curtis Foster

By *Hugh D. Drake*
Attorney

July 23, 1968 L. C. FOSTER 3,394,381
ACCELERATION RECORDER
Filed Feb. 21, 1967 2 Sheets-Sheet 2
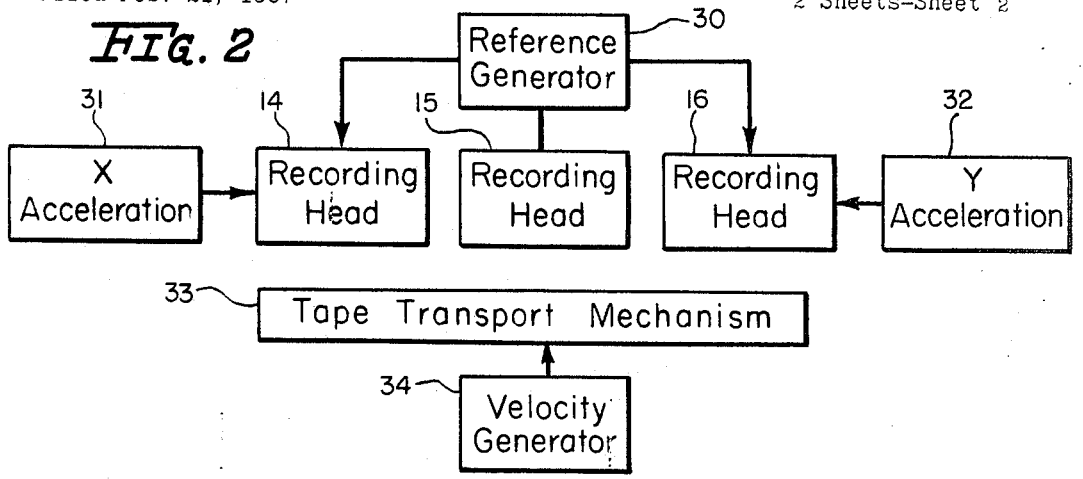
FIG. 2
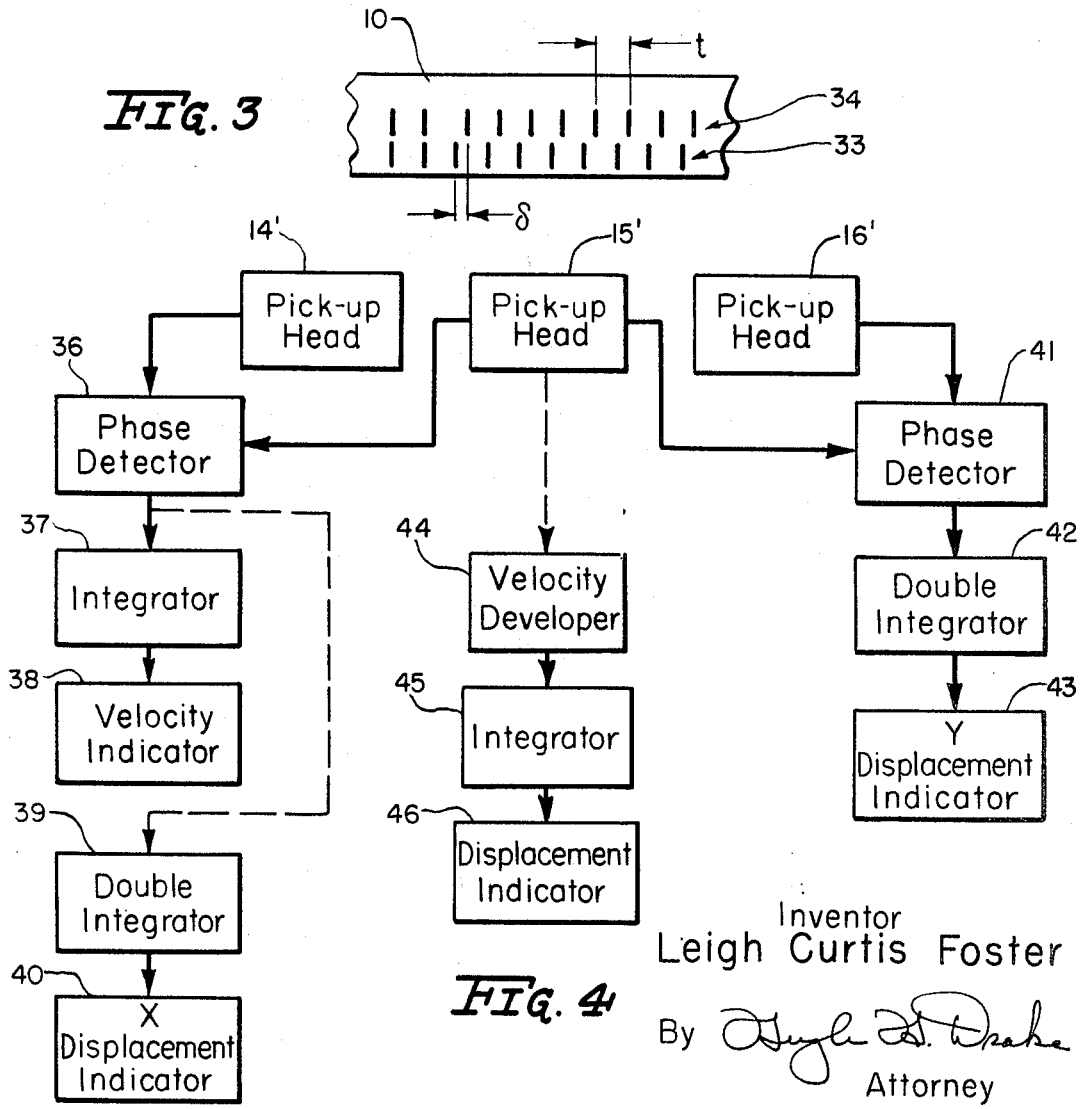
FIG. 3
FIG. 4
Inventor
Leigh Curtis Foster
By Hugh H. Drake
Attorney United States Patent Office 3,394,381
Patented July 23, 1968

3,394,381
ACCELERATION RECORDER
Leigh Curtis Foster, Atherton, Calif., assignor to Zenith Radio Corporation, Chicago, Ill., a corporation of Delaware
Filed Feb. 21, 1967, Ser. No. 617,673
4 Claims. (Cl. 346—7)

ABSTRACT OF THE DISCLOSURE

Three recording heads are spaced across a moving recording tape and all three are simultaneously fed a series of pulse-type signals. One of the heads is fixed, the second moves relative to the first in response to acceleration in an x-direction and the third moves similarly but in response to acceleration in a y-direction. The apparatus is mounted in a vehicle, the tape thus storing information pertaining to its accelerations in coordinate directions and similarly with respect to the magnitude of its velocity. Read-out apparatus used subsequently includes circuits to integrate the stored information and yield indications of velocity and displacement. Those indications permit the route taken by the vehicle to be plotted.

---

The present invention pertains to acceleration storage apparatus. More particularly, it relates to apparatus for recording and enabling the playback of information particularly indicative of accelerations udergone by an object such as a vehicle.

Highly sophisticated inertial guidance and tracking systems have been developed for use with aircraft and space vehicles. These systems typically include acceleration-responsive apparatus which develop signals representing acceleration components in each of the three directions of a tri-coordinate system. Together with numerous other devices and complex circuitry, such apparatus accurately enables the determination of spatial position of the vehicle. Somewhat generally speaking, the basic mode of operation is to determine precisely where the vehicle has been by sensing its changes in acceleration and as it travels in order to arrive at a determination of its displacement.

In a considerably different field of activity, there also may be a desire to know the route taken by an earth-bound vehicle. For example, truck fleet operators are from time to time subjected to losses arising out of unauthorized deviations or departures of their trucks from scheduled or appointed routes. Rather than having to assign an investigator to follow different ones of a perhaps large number of trucks in a fleet, an operator can benefit greatly from the use of means which enable the actual route taken by the truck to be determined.

Presumably, this latter objective may be attained by installing in the truck an inertial guidance system of the kind first mentioned above. Such an approach, however, is prohibitively costly because of the complexity and the degree of precision for which such prior systems are suited.

It is a general object of the present invention to provide acceleration storage apparatus which is characterized by simplicity and economy.

A further object of the present invention is to provide acceleration storage apparatus which enables determination of the route taken by an object such as a vehicle but yet which only need be of such a degree of sophistication as is necessary for achieving comparatively low-precision information of that type.

Acceleration storage apparatus in accordance with the present invention includes a recording medium responsive to stimuli for exhibiting conditions representative of that stimuli and means for developing a reference signal. At least two recording heads both are responsive to the reference signal for creating a stimuli individually in respectively different regions of the recording medium, and one of the recording heads is movable in a given direction relative to the other. The apparatus further includes means for moving the recording medium relative to the recording heads and accelerometer means responsive to acceleration in a first direction for moving the one head in the given direction relative to the other head.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

FIGURE 2 is a block diagram of a system which may utilize the apparatus of FIGURE 1;

FIGURE 3 is a diagrammatic view of a recording medium bearing certain information; and FIGURE 4 is a block diagram of readout apparatus utilizable in conjunction with the apparatus and systems of the other figures.

Figure 1:
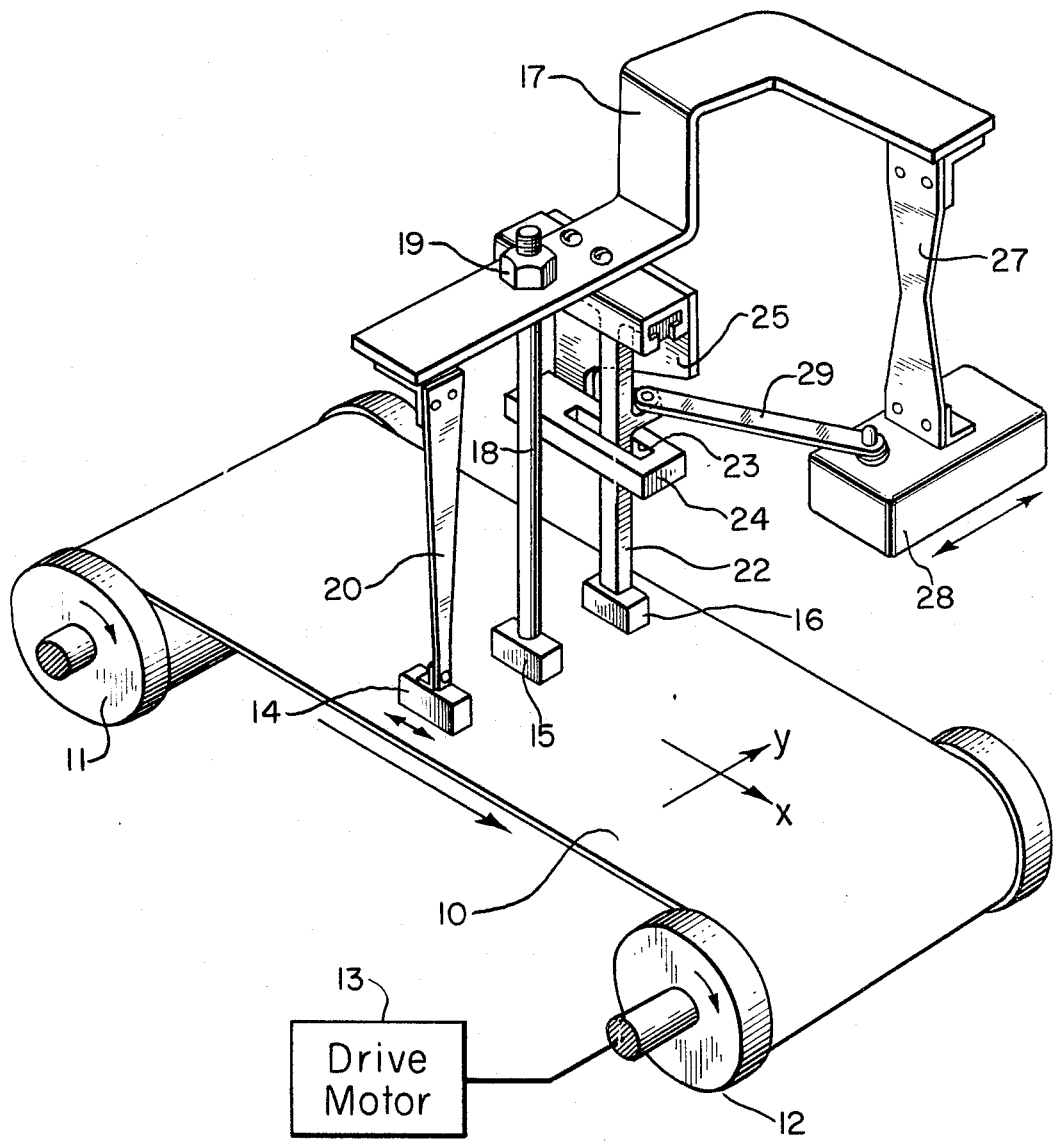
FIGURE 1 is a simplified perspective view, partially in schematic form, of an acceleration storage apparatus embodying the present invention.

In FIGURE 1, a magnetic recording tape 10 is drawn as indicated in an x-direction from a supply reel 11 by a take-up reel 12 in turn driven by a motor 13. Spaced across the width of tape 10 in the indicated y-direction are three separate magnetic recording heads 14, 15 and 16 each of which by itself is entirely conventional. Upon supplying signals to recording heads while tape 10 is caused to move relative thereto in the direction as indicated by the arrow in FIGURE 1, three respective recording tracks are defined along the length of the tape. That is, each of the recording tracks represents a distinct region of the recording medium and the signals fed to the recording heads create magnetic stimuli which cause magnetic conditions representative of the stimuli to be stored along those regions or tracks.

Centrally located recording head 15 is in this case rigidly supported from a bracket 17 by a rod 18 affixed at one end to head 15 and secured through a hole in bracket 17 by a nut 19. Recording head 14 is suspended beneath bracket 17 by a resilient element 20 secured at one end to the recording head and affixed at its other end to the underside of bracket 17. Resilient element 20 as illustrated is a strap of spring material shaped to flex only in the x-direction with the amount of flexure being proportional to the inertial force exerted at any time upon recording head 14. Of course, that force is proportional to the product of the effective mass of head 14 and its acceleration.

Recording head 16 is suspended from a post 22 constrained by a guideway at its upper end to move in the same x-direction as recording head 14 by a slot 23 cut in a plate 24. Plate 24 is rigidly supported beneath bracket 17 by a connecting element 25. Also depending downwardly from bracket 17 is another flexible strap 27 secured at its upper end to the bottom surface of bracket 17 and affixed at its lower end to a block 28. Strap 27 is like strap 20 in that it is resilient, being made of flexible material so as to exhibit a degree of resilient flexure corresponding to movement of block 28 in response to forces exerted thereon. In this case, the orientation and shape of strap 27 is such as to permit movement of block 28 substantially only in the y-direction.

Again, as in the case of recording head 14, the force exerted upon block 28 is proportional to the product of its effective mass and its acceleration. However, that acceleration is, as noted, in the y-direction. Translating the movement of block 28 to recording head 16 is a bar 29 pivotally connected at one end to block 28 and at its other to post 22. Consequently, the y-direction movement of block 28 is translated into x-direction movement of recording head 16.

In use in the exemplary application for permitting subsequent determination of the route taken by a vehicle such as a truck, bracket 17 is firmly secured relative to the vehicle chassis and the tape transport mechanism including reels 11 and 12 likewise are stationary relative to the chassis. When the vehicle is stationary, both recording heads 14 and 16 are retained in a fixed spatial position relative to recording head 15. Assuming that the heads are aligned in the y-direction laterally of tape 10 and that they are simultaneously fed with a succession of pulse-like signals, a corresponding succession of spaced lines or rows of individual magnetized areas will be caused to exist in tape 10.

However, when the vehicle is accelerating or decelerating in the the x-direction, the effective inertial mass of recording head 14 causes it to be deflected along the x-axis against the resilience of strap 20 in a direction dependent upon whether the vehicle is accelerating or decelerating. In this condition, the magnetized areas in the track produced by recording head 14 are spatially displaced relative to those produced by recording head 15. At the same time, recording head 16 is still aligned with recording head 15 since strap 27 is oriented so as not to flex along the x-axis. For convenience hereafter, reference will be confined to acceleration, since deceleration may be considered simply as negative acceleration.

Whenever the vehicle is executing a turning movement, it undergoes components of acceleration along the y-axis. When that happens, block 28 correspondingly moves along that axis and link 29 converts that motion to movement of recording head 16 along the x-axis. Consequently, with the same simultaneous signals applied to both recording heads 15 and 16, the succession of magnetic areas produced in tape 10 by recording head 16 are correspondingly displaced relative to recording head 15. At the same time because of the orientation of flexible strap 20, recording head 14 does not undergo any movement as a result of acceleration components in a direction along the y-axis.

From the foregoing, it is evident that the magnetized areas created in tape 10 collectively store information representing accelerations of the vehicle. While as thus far illustrated a series of simultaneous pulses are supplied to the recording heads and the relative spatial positions of the pulses are indicative of the acceleration information, it is apparent that other forms of the applied signal may be used. For example, signals having alternating waveforms may be applied to the recording heads in which case the acceleration information is stored in terms of difference in phase between the recorded information in one track as compared with the next.

A wide variety of different systems employing correspondingly located pick-up heads may be employed to provide a read-out of the stored information. Generally speaking, acceleration information when integrated a first time yields a signal representative of velocity. And when that signal again is integrated the resulting information pertains to displacement. Of course, that particular velocity and displacement information is available only when the vehicle is accelerating. In order, then, to complete a record sufficient to enable complete tracking of vehicular movement, the storage system also retains information with respect either to time or to velocity during such times as there is no acceleration.

In one approach to that end, a fourth recording head is disposed adjacent to tape 10 in order to define a fourth recording track. That recording head is fed with a signal representative at all times of vehicular velocity. For example, a tachometer-type generator driven by the usual speedometer cable in the vehicle produces a signal representative of velocity which drives the fourth recording head. The storage of both velocity and acceleration information permits a determination of displacement occurring at all times. Knowing the speed at which tape 10 travels, it is but a simple matter to compute the actual route travelled by the vehicle provided that the initial starting direction is known. Of course, a dispatcher at the point of departure may record that initial piece of information.

In the preferred system of FIGURE 2, reference as to time is provided by the spacing between pulses. The speed of travel of tape 10 is representative of the instantaneous velocity of the vehicle. To this end, a reference signal is developed by a generator 30 which is in the form of conventional multi-vibrator producing a continuous series of accurately spaced pulses. The spacing between the pulses is preferably small compared to the time during which the accelerations to be recorded are likely to occur; for the exemplary application, the spacing may be one-tenth of a second.

Signals from reference generator 30 are fed in parallel to recording heads 14, 15 and 16 which correspond to the recording heads of the same designation in FIGURE 1. As described with respect to the latter, recording head 14 moves relative to head 15 in response to acceleration along the x-axis, as represented in FIGURE 2 by rectangle 31. Similarly, recording head 16 is caused to move relative to recording head 15 by acceleration along the y-axis, this aspect of the system being represented by rectangle 32 in FIGURE 2. Also in that figure, tape 10 together with its transport mechanism is designated by means of a rectangle 33. Driving tape transport mechanism 33 is a velocity generator 34 which causes tape 10 to move with a speed proportional to the velocity of the vehicle. As indicated above, generator 34 may be of the tachometer type operated by the ordinary speedometer cable present in such vehicles.

FIGURE 3 represents a portion of tape 10 on which a first succession of spaced magnetized areas define a recording track 33 produced by recording head 15 in response to the signals from reference generator 30. A second series of spaced magnetized areas define a recording track 34 produced by recording head 14. The first two magnetized areas in track 34 at the left side of FIGURE 3 are aligned with corresponding magnetized areas in track 33. Since the signals from generator 30 are fed simultaneously to both recording heads 14, 15, this stored information at the left side of FIGURE 3 represents a condition in which the vehicle is undergoing no acceleration along the x-axis.

On the other hand, the following magnetized areas in track 34, further to the right in FIGURE 3, are displaced relative to the corresponding magnetized areas in track 33 by a distance $\delta$. The quantity $\delta$ is proportional to the force acting upon recording head 14 and hence is representative of the product of the mass and acceleration of that recording head. Since the mass is a constant, the quantity $\delta$ in turn is directly proportional to the acceleration.

As mentioned, numerous readout systems can be designed to utilize the stored information. Several different combinations are illustrated in FIGURE 4. This system includes three pick-up heads 14′, 15′ and 16′ that respond respectively to the three recording tracks created by recording heads 14, 15 and 16 of FIGURE 1. The system of FIGURE 4 conventionally is maintained at a place separate from the apparatus of FIGURES 1 and 2 and is utilized to process the information stored by the latter apparatus in a number of different vehicles.

For obtaining an indication of vehicular velocity, the signals developed by pick-up heads 14′ and 15′ are combined in a phase detector 36 the output of which is supplied to an integrator 37 which in turn feeds a velocity indicator 38. Since the signals developed by pick-up heads 14′, 15′ are in phase for the condition of zero acceleration along the X-axis, spatial displacement of the respective magnetized areas appears in the form of a difference in phase. Consequently, phase detector 36 develops an output signal representative of the electrical, and hence of the spatial, delay between the two sets of pulses recorded on tape 10. That output signal is directly representative of the acceleration to which recording head 14 responds. The subsequent integration of the output signal from detector 36 results in a control signal representative of the vehicular velocity instantaneously during the acceleration. This information may be indicated in any manner, such as by display on an oscilloscope or by appropriate marking on a chart-type recorder.

Instead of or in addition to feeding the signal from detector 36 to integrator 37, that signal may be fed to a double integrator 39 which develops a control signal which in turn is fed to an x-displacement indicator 40. That is, double integration of the acceleration-representative signal developed by phase detector 36 directly provides a control signal representing displacement during acceleration of the vehicle along the x-axis. Likewise this information may be displayed or exhibited by any conventional means.

As further shown in FIGURE 4, the signals developed by pick-up heads 15′ and 16′ are fed to a phase detector 41 the output signal from which is fed to a double integrator 42 which develops a control signal in turn fed to a y-displacement indicator 43. These elements operate, in the same way as detector 36, double integrator 39 and x-displacement indicator 40 to doubly integrate a signal representative of acceleration of recording head 16 along the y-axis so as to provide a control signal which represents displacement of the vehicle along the y-axis.

In still another branch of the circuitry shown in FIGURE 4, the signal developed by pick-up head 15, is fed directly to a velocity developer 44 which produces an output signal directly representative of the vehicular velocity. That signal is in turn fed to an integrator 45 which develops a control signal representative of displacement which is supplied to a displacement indicator 46. Since the spacing $t$ (FIGURE 3) of the reference pulse recording produced by generator 30 is constant in terms of time and the speed at which tape 10 travels is directly proportional to vehicular velocity, that spacing $t$ changes in correspondence with changes in the vehicular velocity. The frequency or pulse-repetition-rate of the reference signals picked up by head 15′ is detected in developer 44 which operates as a linear frequency discriminator and produces an output signal directly representing the velocity. The subsequent integration of this signal results in a control signal which represents the actual displacement of the vehicle without regard to direction of that displacement.

As one example of the use of the FIGURE 4 system, the signal from integrator 45 may be utilized to drive a chart recorder at a speed representative of the absolute vehicular displacement. With movement of the vehicle in a straight line corresponding to movement along the x-axis in FIGURE 1, the y-displacement signal produced by integrator 42 is then used to cause the recorder pen to move transverse to the chart-movement direction in order to record all departures, in both magnitude and direction, toward or away from the original x-axis direction. Subsequently, inspection of the tracing on the chart provides all that is necessary to plot upon a map the route taken by the vehicle, assuming that the starting point and starting direction are known.

As another exemplary use of information developed by the system of FIGURE 4, a conventional x–y chart recorder is used with its coordinate-related input terminals being respectively fed with the signals from integrators 39 and 42. The resulting tracing represents all displacements due to acceleration or deceleration relative to any selected reference axis. In this case, the velocity during periods of zero acceleration or deceleration may be recorded either by the use of a separate chart recorder pen or by driving the chart at a speed representative of the velocity as developed, for instance, by integrator 45.

It will be observed that complete tracking information is obtainable when desired by using only two tracks on tape 10. This is achieved in one embodiment simply by aligning the x-axis with the normal or straight-ahead direction of vehicle movement so that only information with respect to velocity in that direction is needed. Pick-up head 16 by itself then enables storage of displacement transverse to the x-axis so that all turning movements ultimately may be plotted. In an alternative arrangement, the y-direction information is derived directly from the steering system of the vehicle. That is, instead of using the pendlum-type movement of block 28 to move head 16, the latter is coupled to the steering gear so as to record amount, direction and duration of turning attitude. This approach, however, requires calibration of the system in terms of the different steering characteristics of individually different vehicles.

From these few examples, it is evident that very complete and even redundant information is available from the system of FIGURE 4 for enabling charting or plotting the movement which the vehicle has taken. Further combination of the information provided, which of course can readily be programmed into a simple computer, enables the development of control signals that drive a recording-chart type instrument which directly plots the actual movement of the vehicle. By using this chart as an overlay on a map of the same scale, the exact route may be shown. Moreover, since such a map actually shows the roads in the area, the observer can readily compensate for any errors or lack of precision by modifying the information at hand to follow actual roadways available to the vehicle. In this way, any such error is correctable at each and every turn.

It will be observed that the device of FIGURE 1, which is the portion of the overall system ordinarily needed in quantity for the individual vehicles may be of extremely simple, small and rugged construction. For example, with a nominal recording tape speed of 0.030 inch per second, an ordinary two-inch diameter roll of recording tape provides about twenty-four hours of operation. This reduced recording speed is practical because the informational bandwidth necessary for the degree of precision required is likewise very small. For use at such a slow recording speed, the maximum displacement of one of the recording heads in response to acceleration, the maximum value of $\delta$ in FIGURE 3, preferably should be less than .003 inch. Hence, flexural straps 20 and 27 should have a comparatively heavy spring constant and a relatively high frequency of mechanical resonance. They should, of course, also be appropriately damped.

In utilizing the readout information, pick-up heads 14′–16′ may be caused to reciprocate back and forth in unison along the tape movement direction so as to scan a recording time of, for example, two minutes. This enables the signals developed by the recording heads to be displayed on an oscilloscope, in order to assist the person actually using the information to trace a path on a map by informing him of approaching accelerations. In another utilization, the desired portion of the FIGURE 4 system, such as that including indicators 43 and 46, are carried by another vehicle which is driven in response to the indications in order to follow the path taken by the original vehicle. This is a very practical approach inasmuch as it enables the operator of the second vehicle to make corrections necessary as different turning movements arise in order to compensate for lack of precision purposely designed into the system to keep it simple. This exemplifies and sharpens the contrast between the presently disclosed system and those inertial guidance and tracking systems of the highly sophisticated nature mentioned in the introduction.

I claim:

1. Acceleration storage apparatus comprising:
   a recording medium responsive to stimuli for exhibiting conditions representative of said stimuli;
   means for developing a reference signal; two recording heads both responsive to said reference signal for creating said stimuli individually in respectively different regions of said mediums, one of said heads moveable in a given direction relative to the other;
   driving means for moving said medium relative to said recording heads;
   accelerometer means responsive to acceleration in a first direction for moving said one head in said given direction relative to said other head;
   a third recording head responsive to said reference signal for creating one of said stimuli in a region of said medium different from the region corresponding to said two heads and moveable relative to said other head in said given direction;
   and second accelerometer means responsive to movement in a second direction transverse to said given direction for moving said third head in said given direction.

2. Apparatus as defined in claim 1 in which said apparatus is included within a vehicle normally moving in said given direction and the first acceleration means responds to acceleration in said given direction.

3. Acceleration storage apparatus comprising:
   a recording medium responsive to stimuli for exhibiting conditions representative of said stimuli;
   means for developing a reference signal;
   at least two recording heads both responsive to said reference signal for creating said stimuli individually in respectively different regions of said medium, one of said heads being moveable in a given direction relative to the other;
   driving means for moving said medium relative to said recording heads;
   and accelerometer means responsive to acceleration in a first direction for moving said one head in said given direction relative to said other head;
   in which said apparatus is included within a vehicle moveable at different velocities and in which said driving means moves said medium at a speed representative of the instantaneous velocity of said vehicle.

4. Apparatus as defined in claim 3 in which said reference signal is of constant frequency.

References Cited
UNITED STATES PATENTS

| | | | |
|---|---|---|---|
| 2,695,211 | 11/1954 | Guttwein et al. | 346—7 |
| 2,827,622 | 3/1958 | Guttwein | 340—174.1 |

RICHARD B. WILKINSON, *Primary Examiner.*

J. W. HARTARY, *Assistant Examiner.*